(12) United States Patent
Ku

(10) Patent No.: US 8,446,476 B2
(45) Date of Patent: May 21, 2013

(54) IMAGE STABILIZER AND ANTI-VIBRATION CAMERA MODULE USING SAME

(75) Inventor: Ping-Han Ku, Taipei Hsien (TW)

(73) Assignee: Wcube Co., Ltd., George Town (KY)

( * ) Notice: Subject to any disclaimer, the term of this patent is extended or adjusted under 35 U.S.C. 154(b) by 294 days.

(21) Appl. No.: 12/898,680

(22) Filed: Oct. 5, 2010

(65) Prior Publication Data

US 2012/0044370 A1 Feb. 23, 2012

(30) Foreign Application Priority Data

Aug. 20, 2010 (TW) .................................. 99128037

(51) Int. Cl.
*H04N 5/225* (2006.01)
(52) U.S. Cl.
USPC ...................................... 348/208.11; 348/374
(58) Field of Classification Search
USPC .................. 348/208.99, 208.4, 208.5, 208.7, 348/208.11, 374; 359/557; 396/55
See application file for complete search history.

(56) References Cited

U.S. PATENT DOCUMENTS

| | | | | |
|---|---|---|---|---|
| 7,161,621 B2* | 1/2007 | Kai et al. | ................. | 348/208.11 |
| 7,783,179 B2* | 8/2010 | Takahashi | .................. | 348/208.7 |
| 8,041,201 B2* | 10/2011 | Eromaki et al. | ................ | 396/55 |
| 2008/0079813 A1* | 4/2008 | Suzuki | ...................... | 348/208.11 |
| 2009/0201381 A1* | 8/2009 | Byon et al. | ............... | 348/208.11 |
| 2009/0232483 A1* | 9/2009 | Anshita | .................... | 348/208.11 |
| 2010/0238307 A1* | 9/2010 | Lee | ........................... | 348/208.7 |
| 2011/0050922 A1* | 3/2011 | Chiu | ........................ | 348/208.99 |
| 2011/0158616 A1* | 6/2011 | Chiang | .......................... | 396/55 |
| 2012/0154614 A1* | 6/2012 | Moriya et al. | ............. | 348/208.5 |

* cited by examiner

*Primary Examiner* — Jason Whipkey

(74) *Attorney, Agent, or Firm* — Altis Law Group, Inc.

(57) ABSTRACT

An image stabilizer includes a circuit board, a stationary member secured on the circuit board and defines a first receiving space and a first central axis, a moveable member received in the first receiving space, a driving assembly including a first magnetic member secured to the stationary member and a second magnetic member secured to the moveable member, a resilient assembly interconnecting the stationary member and the moveable member, and a photo-detector fixed on the circuit board and facing the moveable member. The driving assembly drives the moveable member to rotate about a first axis and a second axis relative to the stationary member through magnetic interaction between the first and second magnetic members. The resilient assembly counter-rotates the moveable member about the first axis and the second axis relative to the stationary member. The photo-detector detects vibration or movement of the moveable member relative to the stationary member.

17 Claims, 5 Drawing Sheets

IMAGE STABILIZER AND ANTI-VIBRATION CAMERA MODULE USING SAME

BACKGROUND

1. Technical Field

The present disclosure relates to imaging technologies and, particularly, to an image stabilizer and an anti-vibration camera module using the image stabilizer.

2. Description of Related Art

With ongoing developments in imaging and multimedia technology, camera modules have been widely used in many kinds of consumer electronic devices, such as cellular phones, laptops, digital cameras, and personal digital assistants (PDAs). Generally, a camera module includes a lens module, an image sensor such as a charge-coupled device (CCD) or a complementary metal oxide semiconductor (COMS). Light reflected by an object passes through the lens module to impinge on the image sensor. The image sensor is configured for capturing an image of the object by receiving the light.

However, image quality of these electronic devices is negatively affected when subjected to vibration from external forces. Such vibration causes deflection of the optical axis of the camera module, resulting in a blurred image being captured.

Therefore, what is needed is an image stabilizer and an anti-vibration camera module using the same which can overcome the above-mentioned problems.

DETAILED DESCRIPTION

Figure 1:
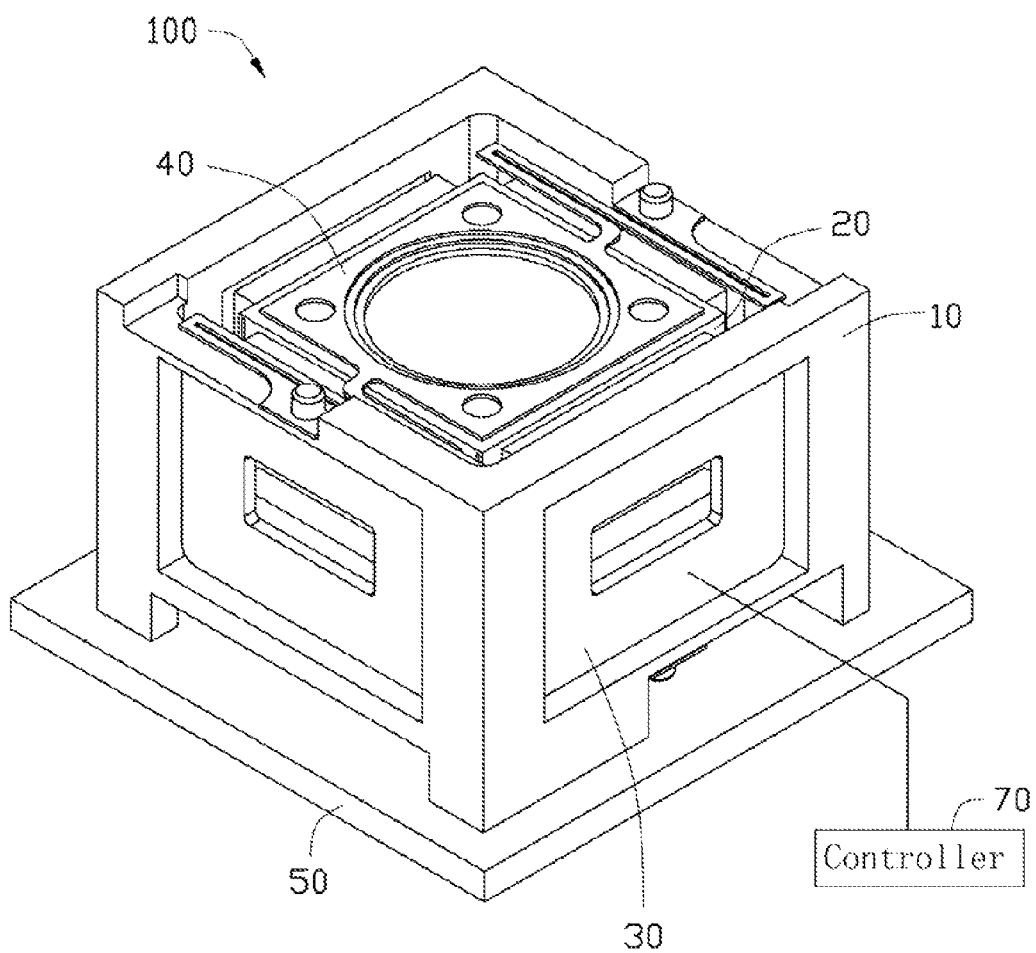
FIG. 1 is a schematic, isometric view of an image stabilizer including a stationary member, according to a first exemplary embodiment.
Figure 2:
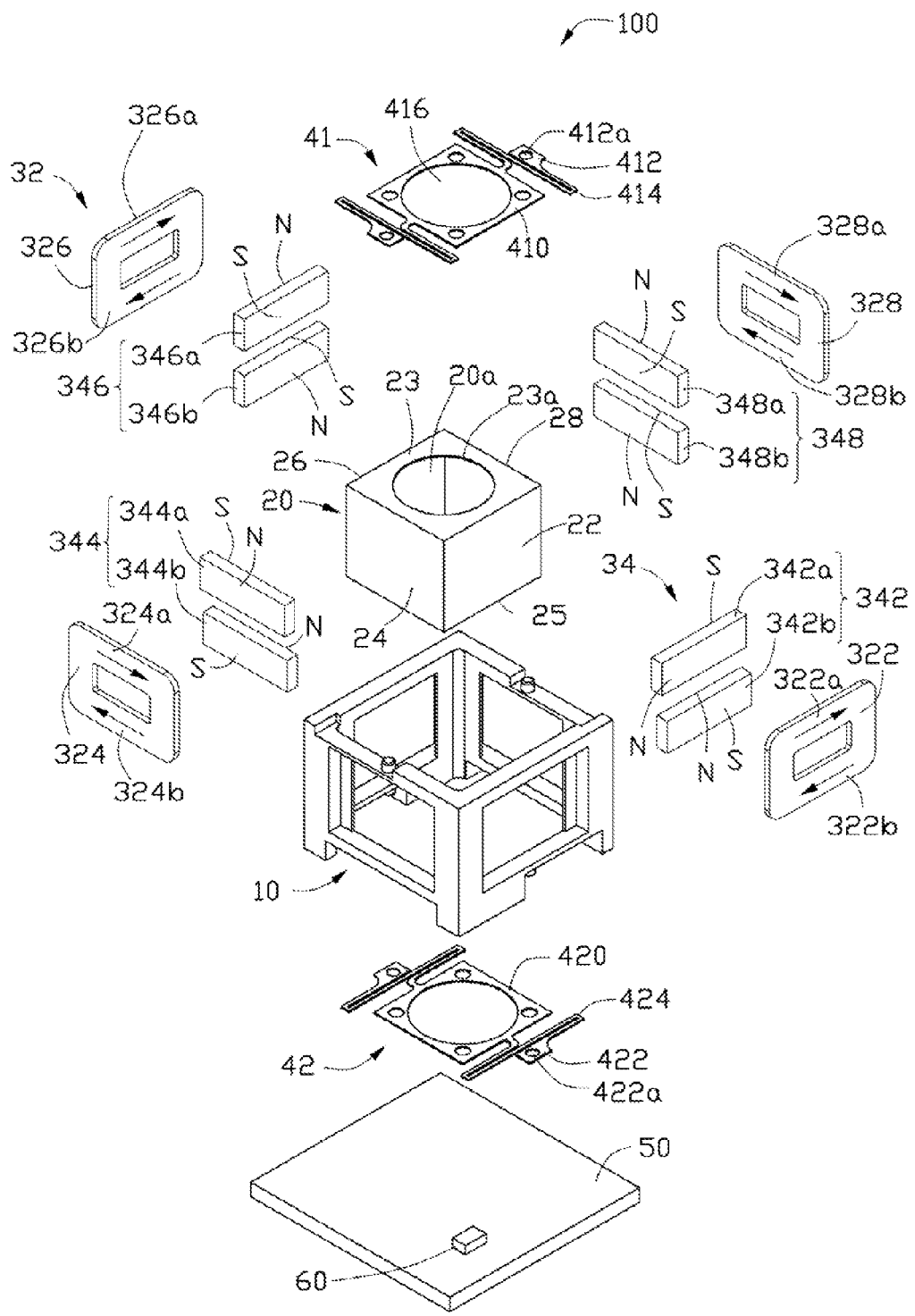
FIG. 2 is an exploded view of the image stabilizer of FIG. 1.
Figure 3:
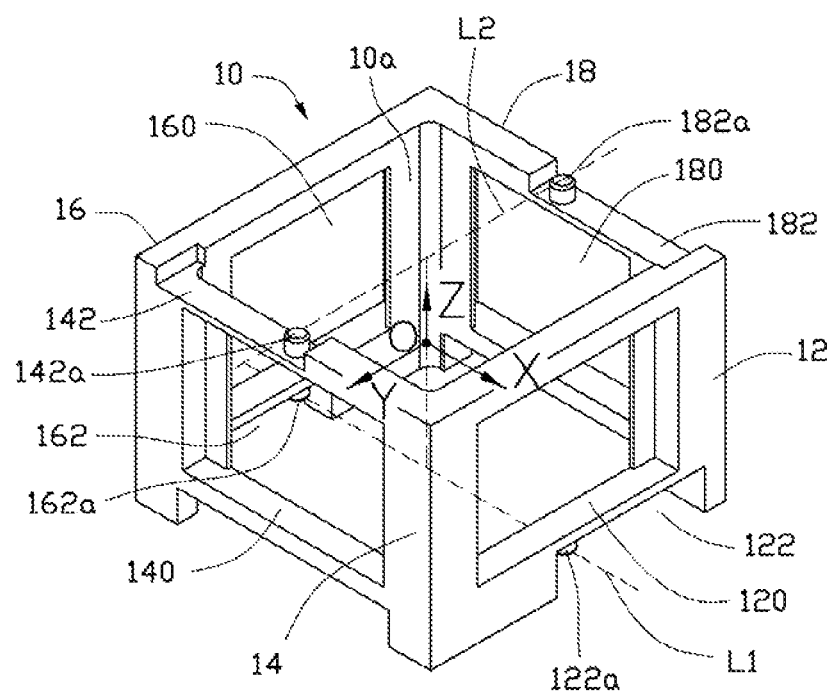
FIG. 3 is an enlarged view of the stationary member of FIG. 1.

Referring to FIGS. 1-3, an image stabilizer 100, according to a first exemplary embodiment, includes a stationary member 10, a moveable member 20, a driving assembly 30, a resilient assembly 40, a circuit board 50, a photo-detector 60, and a controller 70.

The stationary member 10 may be fixed to an electronic device, such as a digital camera. Referring to FIG. 3, the stationary member 10 is substantially cuboid-shaped and includes a first sidewall 12, a second sidewall 14, a third sidewall 16, and a fourth sidewall 18. The four sidewalls 12, 14, 16, and 18 connect to each other end to end correspondingly and cooperatively define a first receiving space 10a.

The first sidewall 12 defines a first receiving hole 120. The second sidewall 14 defines a second receiving hole 140. The third sidewall 16 defines a third receiving hole 160. The fourth sidewall 18 defines a fourth receiving hole 180. The four receiving holes 120, 140, 160, and 180 are in communication with the first receiving space 10a.

The first sidewall 12 includes a first positioning groove 122 at a lower side thereof and a first positioning post 122a in the first positioning groove 122. The height of the first positioning post 122a is substantially the same as the depth of the first positioning groove 122. The first positioning post 122a is located at a middle of the lower side of the first sidewall 12. The third sidewall 16 includes a third positioning groove 162 at a lower side thereof and a third positioning post 162a in the third positioning groove 162. Configurations of the third positioning groove 162 and the third positioning post 162a are substantially the same as those of the first positioning groove 122 and the first positioning post 122a. The positioning grooves 122, 162 are positioned in a centrally symmetric relationship with respect to a midpoint of a section of the line passing through the center of the positioning posts 122a, 162a. Therefore, the line passing through the center of the positioning posts 122a, 162a is defined as a first line L1.

The second sidewall 14 includes a second positioning groove 142 at an upper side thereof and a second positioning post 142a in the second positioning groove 142. The height of the second positioning post 142a is substantially the same as the depth of the second positioning groove 142. The second positioning post 142a is located at a middle of the upper side of the second sidewall 14. The fourth sidewall 18 includes a fourth positioning groove 182 at an upper side thereof and a fourth positioning post 182a in the fourth positioning groove 182.

Configurations of the fourth positioning groove 182 and the fourth positioning post 182a are substantially the same as those of the second positioning groove 142 and the second positioning post 142a. The positioning grooves 142, 182 are positioned in a centrally symmetric relationship with respect to a midpoint of a section of the line passing through the centers of the positioning posts 142a, 182a. Therefore, the line passing through the centers of the positioning posts 142a, 182a is defined as a second line L2. In this embodiment, the first line L1 is spatially perpendicular to the second line L2. A first central axis of the stationary member 10 perpendicularly passes through the first and second lines L1, L2. A coordinate system is defined as following: the first central axis of the stationary member 10 is defined as Z axis. A line perpendicular to the Z axis, and parallel to the first L1 and passing through a midpoint of a section of the line passing through the first and second lines L1, L2 is defined as X axis. A line perpendicular to the Z and X axis and passing through the midpoint of a section of the line passing through the first and second lines L1, L2 is defined as Y axis, as shown in FIG. 3.

The moveable member 20 is substantially a hollow cube and is moveably received in the first receiving space 10a and spaced from the stationary member 10. The moveable member 20 defines a second receiving space 20a therein and includes a first side surface 22, a second side surface 24, a third side surface 26, a fourth side surface 28, an upper surface 23, and a lower surface 25. The four side surfaces 22, 24, 26, and 28 connect each other end to end correspondingly. The upper surface 23 and the lower surface 25 connect the four side surfaces 22, 24, 26, and 28. The upper surface 23 defines an aperture 23a in communication with the second receiving space 20a.

The driving assembly 30 includes a first magnetic member 32 and a second magnetic member 34. The first magnetic member 32 is attached to the stationary member 10. The second magnetic member 34 is fixed to the moveable member 20 facing the first magnetic member 32. The driving assembly 30 is configured for driving the moveable member 20 to rotate about the X axis or the Y axis relative to the stationary member 10 through interaction between the first magnetic member 32 and the second magnetic member 34.

The first magnetic member 32 includes a first coil 322, a second coil 324, a third coil 326, and a fourth coil 328. The four coils 322, 324, 326 and 328 are a rectangular ring and received in the four receiving holes 120, 140, 160, and 180, respectively. In detail, the first coil 322 is received in the first receiving hole 120 and includes a first upper side 322a and a first lower side 322b opposite to the first upper side 322a. The second coil 324 is received in the second receiving hole 140 and includes a second upper side 324a and a second lower side 324b opposite to the second upper side 324a. The third coil 326 is received in the third receiving hole 160 and includes a third upper side 326a and a third lower side 326b opposite to the third upper side 326a. The fourth coil 328 is received in the fourth receiving hole 180 and includes a fourth upper side 328a and a fourth lower side 328b opposite to the fourth upper side 328a. Electric current can be applied to the four coils 322, 324, 326 and 328 so that the four coils 322, 324, 326, and 328 generate magnetic field.

The second magnetic member 34 includes a first magnetic unit 342, a second magnetic unit 344, a third magnetic unit 346, and a fourth magnetic unit 348. The four magnetic units 342, 344, 346, and 348 are attached on the four side surfaces 22, 24, 26, and 28, respectively.

Each magnetic unit 342, 344, 346, 348 includes an upper magnet and a lower magnet. A magnetic pole of the upper magnet facing a corresponding coil is opposite to the magnetic pole of the lower magnet facing the corresponding coil. In detail, the first magnetic unit 342 includes a first upper magnet 342a and a first lower magnet 342b. The first upper magnet 342a and the first lower magnet 342b are attached on the first side surface 22 and separated apart from each other. The magnetic north of the first upper magnet 342a faces the first coil 322. The magnetic south of the first lower magnet 342b faces the first coil 322. The second magnetic unit 344 includes a second upper magnet 344a and a second lower magnet 344b. The second upper magnet 344a and the second lower magnet 344b are attached on the second side surface 24 and separated apart from each other. The magnetic north of the second upper magnet 344a faces the second coil 324. The magnetic south of the second lower magnet 344b faces the second coil 324. The third magnetic unit 346 includes a third upper magnet 346a and a third lower magnet 346b. The third upper magnet 346a and the third lower magnet 346b are attached on the third side surface 26 and separated apart from each other. The magnetic north of the third upper magnet 346a faces the third coil 326. The magnetic south of the third lower magnet 346b faces the third coil 326. The fourth magnetic unit 348 includes a fourth upper magnet 348a and a fourth lower magnet 348b. The fourth upper magnet 348a and the fourth lower magnet 348b are attached on the fourth side surface 28 and separated apart from each other. The magnetic north of the fourth upper magnet 348a faces the fourth coil 328. The magnetic south of the fourth lower magnet 348b faces the fourth coil 328.

The resilient assembly 40 interconnects the stationary member 10 and the moveable member 20. The resilient assembly 40 includes an upper resilient member 41 and a lower resilient member 42.

The upper resilient member 41 includes a moveable portion 410, a stationary portion 412 and a bent portion 414. The bent portion 414 connects the moveable portion 410 to the stationary portion 412. The shape of the moveable portion 410 is substantially the same as that of the upper surface 23. The moveable portion 410 defines a through hole 416 having a diameter slightly greater than that of the aperture 23a. The through hole 416 is aligned with the aperture 23a. The moveable portion 410 is securely attached to the upper surface 23 and moves together with the moveable member 20.

In this embodiment, the bent portion 414 includes two bent arms 414. The stationary portion 412 includes two stationary plates 412 received in the positioning grooves 142, 182. The bent arms 414 and the stationary plates 412 extend from opposite sides of the moveable portion 410 along the Y axis in that order. The two bent arms 414 are symmetrical about the X axis. The two stationary plates 412 are symmetrical about the X axis. The bent arm 414 includes two bent parts which can provide a symmetrical/even elastic force.

Each stationary plate 412 defines a positioning hole 412a. The positioning posts 142a, 182a extend through the two positioning holes 412a so that the upper resilient member 41 is positioned on the second sidewall 14 and the fourth sidewall 18.

Structure of the lower resilient member 42 is substantially same as that of the upper resilient member 41. The moveable portion 410 of the lower resilient member 42 is securely attached to the lower surface 25 and moves together with the moveable member 20. The two bent arms 424 are symmetrical about the Y axis. The two stationary plates 422 are received in the positioning grooves 122, 162 and are symmetrical about the Y axis. The positioning posts 122a, 162a extend through the two positioning holes 422a so that the lower resilient member 42 is positioned on the first sidewall 12 and the third sidewall 16. Therefore, the moveable member 20 is elastically supported in the stationary member 10 by the resilient members 41, 42 of the resilient assembly 40.

The circuit board 50 is fixed to the electronic device and supports the stationary member 10. The photo-detector 60 is assembled on the circuit board 50 and faces the moveable member 20. In particular, the photo-detector 60 is oriented towards a bottom side of the moveable member 20. The photo-detector 60 may be a laser sensor or an infrared sensor. When the electronic device experiences vibration or movement, the moveable member 20 moves relative to the electronic device, while the photo-detector 60 and the stationary member 10 are stationary relative to the electronic device. Therefore, the photo-detector 60 is configured for detecting vibration or movement of the moveable member 20 relative to the stationary member 10.

The controller 70 is electrically connected to the photo-detector 60 and the four coils 322, 324, 326 and 328. The controller 60 is configured for controlling the driving assembly 30 to drive the moveable member 20 to rotate based on the detected vibration or movement of the moveable member 20.

Figure 4:
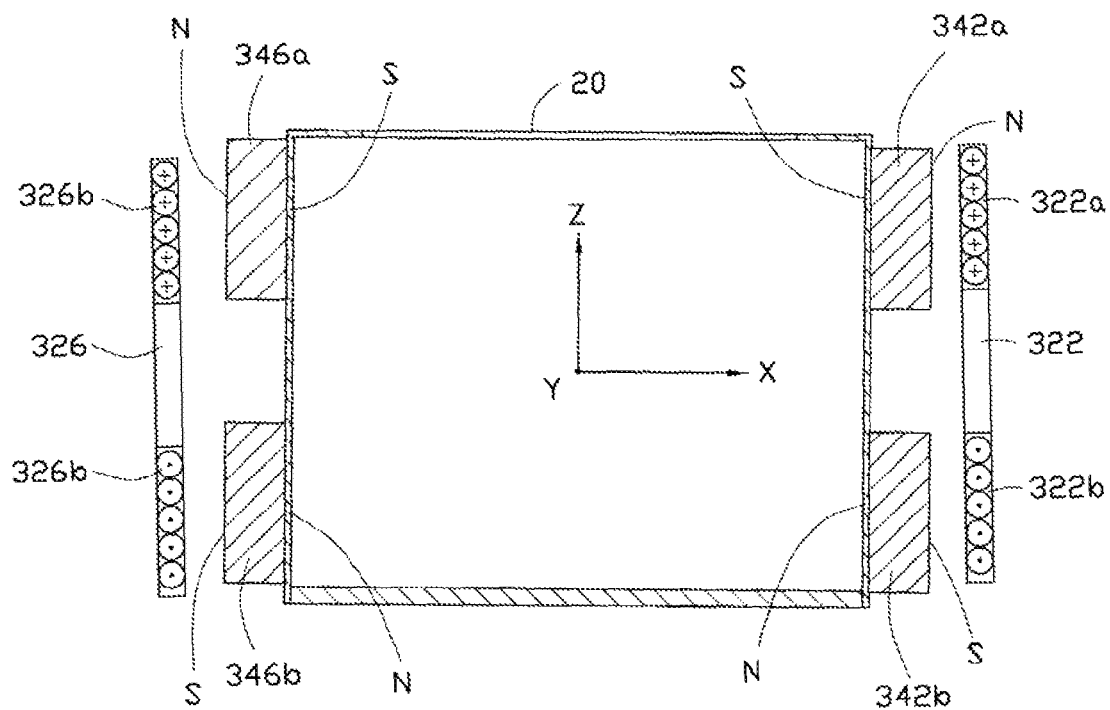
FIG. 4 is a schematic view of a working principle of the image stabilizer of FIG. 1.
Figure 5:
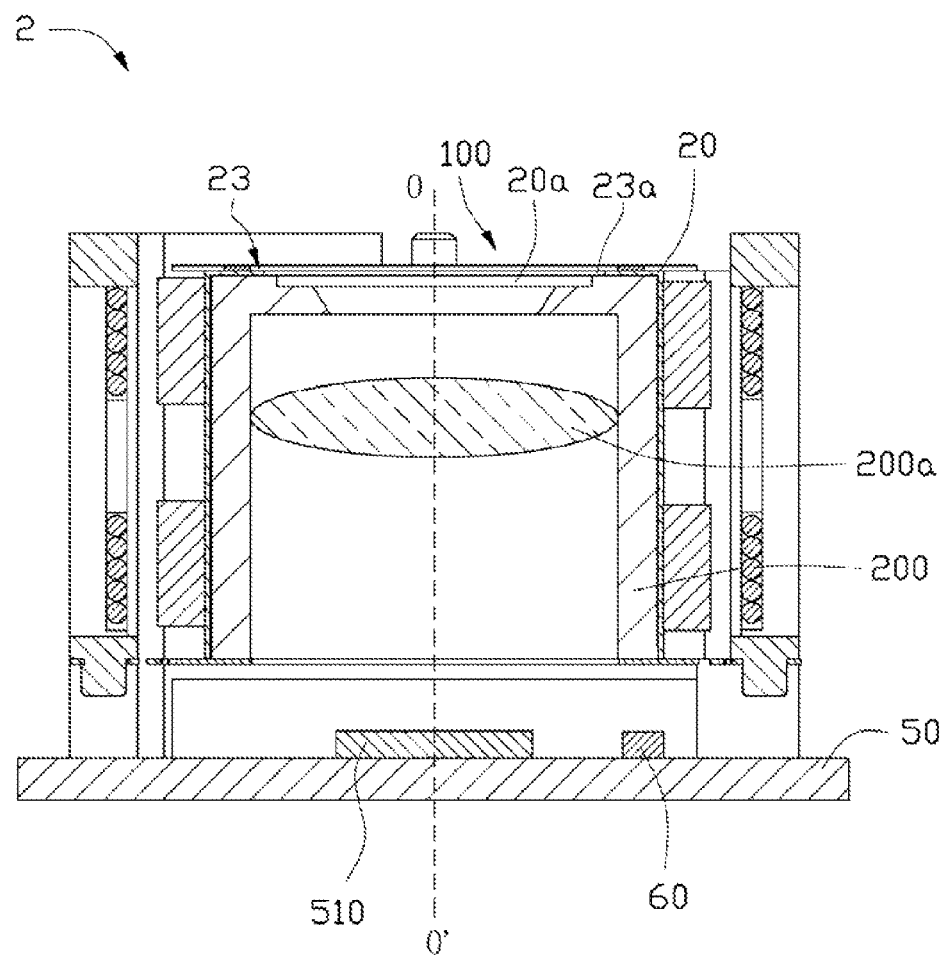
FIG. 5 is a sectional view of an anti-vibration camera module, according to a second exemplary embodiment.

Referring to FIG. 4, dots shown in the coil represents that a current in the coil goes perpendicularly away from the illustration and plus signs shown in the coil represents that current in the coil goes perpendicularly towards the illustration. When in use, for example, currents applied to the first coil 322 and the third coil 326 are shown as ring-shaped lines with arrows in the coils 322 and 326 in FIG. 2. Therefore, the first coil 322 and the third coil 326 generate magnetic fields. Accordingly, an attractive force is applied to the first upper magnet 342a by the first upper side 322a of the first coil 322, and a repellent force is applied to the first lower magnet 342b by the first lower side 322b of the first coil 322. Similarly, a repellent force is applied to the third upper magnet 346a by the third upper side 326a of the third coil 326, and an attractive force is applied to the third lower magnet 346b by the third lower side 326b of the third coil 326. Therefore, a clockwise torque force about the Y axis is applied to the moveable member 20 and the moveable member 20 is driven to move clockwise about the Y axis. Meanwhile, the bent arms 414 and 424 are bent because of a movement of the moveable member 20. When the currents in the coils 322 and 326 are gone, the bent arms 414 and 424 are restored to drive the moveable member 20 counterclockwise about the Y axis.

Similarly, when current applied to the second coil 324 and the fourth coil 328 is shown as arrows in the coils 324 and 328 in FIG. 2, the moveable member 20 is driven to rotate about the X axis by interaction between the coils 324 and 328 and the magnetic units 344 and 348. When the current in the coils 324 and 328 is gone, the bent arms 414 and 424 are restored to drive the moveable member 20 to an initial position.

It is to be understood that in alternative embodiments, the magnetic poles of the second magnetic member 34 may be magnetically changed, and the directions of currents applied to the first magnetic member 32 may be changed accordingly.

Referring to FIG. 4 together with FIG. 2, an anti-vibration camera module 2, according to a second exemplary embodiment, includes the image stabilizer 100, a lens module 200, and an image sensor 510.

The lens module 200 and the image sensor 510 are received in the second receiving space 20*a* of the moveable member 20. The lens module 200 may be an auto-focus lens module having such as an actuator to drive a lens 200*a*. The image sensor 510 is securely and electrically attached to the circuit board 50. An optical axis OO' of the lens module 200 is aligned with the image sensor 510 and a center of the aperture 23*a* of the upper surface 23. When the anti-vibration camera module 2 experiences vibration or movement, the moveable member 20 is driven to rotate about the X and/or Y axis to compensate the vibration or movement.

It is to be understood, however, that even though numerous characteristics and advantages of the present embodiments have been set fourth in the foregoing description, together with details of the structures and functions of the embodiments. The disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. An image stabilizer, comprising:
    a circuit board;
    a stationary member fixed on the circuit board and defining a first receiving space and a first central axis;
    a moveable member received in the first receiving space and spaced from the stationary member, the moveable member defining a second central axis coinciding with the first central axis;
    a driving assembly comprising a first magnetic member fixed to the stationary member and a second magnetic member fixed to the moveable member, the first magnetic member facing the second magnetic member, the driving assembly configured for driving the moveable member to rotate about a first axis and a second axis relative to the stationary member through magnetic interaction between the first magnetic member and the second magnetic member, the second axis being perpendicular to the first axis, the first axis and the second axis being perpendicular to the first central axis;
    a resilient assembly interconnecting the stationary member and the moveable member, the resilient assembly configured for counter-rotating the moveable member about the first axis and the second axis relative to the stationary member; and
    a photo-detector fixed on the circuit board and facing the moveable member, the photo-detector configured for detecting movement of the moveable member relative to the stationary member.

2. The image stabilizer as claimed in claim 1, wherein the stationary member includes four sidewalls and four receiving holes respectively defined in the four sidewalls, and the first magnetic member is received in the four receiving holes.

3. The image stabilizer as claimed in claim 2, wherein the moveable member comprises four side surfaces facing the respective sidewalls of the stationary member, and the second magnetic member is positioned on the respective side surfaces.

4. The image stabilizer as claimed in claim 3, wherein the first magnetic member comprises four coils received in the respective receiving holes.

5. The image stabilizer as claimed in claim 4, wherein the second magnetic member comprises four magnetic units each positioned on a corresponding side surface and facing a corresponding coil.

6. The image stabilizer as claimed in claim 5, wherein each magnetic unit comprises an upper magnet and a lower magnet, and a magnetic pole of the upper magnet facing a corresponding coil is opposite to a magnetic pole of the lower magnet facing the corresponding coil.

7. The image stabilizer as claimed in claim 6, wherein the resilient assembly comprises two resilient members, each resilient member comprises a moveable portion, a stationary portion and a bent portion connecting the moveable portion and the stationary portion, the moveable portions are positioned on the moveable member, and the stationary portions are positioned on the stationary member.

8. The image stabilizer as claimed in claim 7, further comprising a controller, wherein the controller is electrically connected to the photo-detector and the four coils, and the controller is configured for controlling the driving assembly to drive the moveable member to rotate according to the detected movement of the moveable member relative to the stationary member.

9. An anti-vibration camera module, comprising:
    a circuit board;
    a stationary member fixed on the circuit board and defining a first receiving space and a first central axis;
    a moveable member received in the first receiving space and spaced from the stationary member, the moveable member defining a second central axis coinciding with the first central axis;
    a driving assembly comprising a first magnetic member fixed to the stationary member and a second magnetic member fixed to the moveable member, the first magnetic member facing the second magnetic member, the driving assembly configured for driving the moveable member to rotate about a first axis and a second axis relative to the stationary member through magnetic interaction between the first magnetic member and the second magnetic member, the second axis being perpendicular to the first axis, the first axis and the second axis being perpendicular to the first central axis;
    a resilient assembly interconnecting the stationary member and the moveable member, the resilient assembly configured for counter-rotating the moveable member about the first axis and the second axis relative to the stationary member;
    a photo-detector fixed on the circuit board and facing the moveable member, the photo-detector configured for detecting movement of the moveable member relative to the stationary member;
    a lens module received in the moveable member; and
    an image sensor fixed on the circuit board and positioned at the image side of the lens module, the lens module optically aligned with the image sensor.

10. The anti-vibration camera module as claimed in claim 9, wherein the second central axis of the moveable member coincides with the optical axis of the lens module.

11. The anti-vibration camera module as claimed in claim 10, wherein the stationary member includes four sidewalls and four receiving holes defined in the respective sidewalls, and the first magnetic member is received in the four receiving holes.

12. The anti-vibration camera module as claimed in claim 11, wherein the moveable member comprises four side surfaces facing the respective sidewalls of the stationary member, and the second magnetic member is positioned on the four side surfaces.

13. The anti-vibration camera module as claimed in claim 12, wherein the first magnetic member comprises four coils each received in a corresponding receiving hole.

14. The anti-vibration camera module as claimed in claim 13, wherein the second magnetic member comprises four magnetic units each positioned on a corresponding side surface and facing a corresponding coil.

15. The anti-vibration camera module as claimed in claim 14, wherein each magnetic unit comprises an upper magnet and a lower magnet, and a magnetic pole of the upper magnet facing a corresponding coil is opposite to a magnetic pole of the lower magnet facing the corresponding coil.

16. The anti-vibration camera module as claimed in claim 15, wherein the resilient assembly comprises two resilient members, each resilient member comprises a moveable portion, a stationary portion and a bent portion connecting the moveable portion and the stationary portion, the moveable portions are positioned on the moveable member, and the stationary portions are positioned on the stationary member.

17. The anti-vibration camera module as claimed in claim 16, further comprising a controller, wherein the controller is electrically connected to the photo-detector and the four coils, and the controller is configured for controlling the driving assembly to drive the moveable member to rotate according to the detected movement of the moveable member relative to the stationary member.

* * * * *